United States Patent [19]

Mueller et al.

[11] Patent Number: 5,706,373
[45] Date of Patent: Jan. 6, 1998

[54] INTEGRATED OPTICAL ARRANGEMENT OF RIDGE WAVEGUIDES ON A SUBSTRATE

[75] Inventors: Gustav Mueller; Lothar Stoll; Ulrich Wolff; Bruno Acklin, all of Munich, Germany

[73] Assignee: Siemens Aktiengesellschaft, Munich, Germany

[21] Appl. No.: 196,039

[22] Filed: Feb. 14, 1994

[30] Foreign Application Priority Data

Feb. 12, 1993 [DE] Germany .................. 43 04 272.4
Dec. 21, 1993 [DE] Germany .................. 43 43 721.4

[51] Int. Cl.$^6$ ................................................. G02B 6/12
[52] U.S. Cl. ................................................. 385/14; 385/147
[58] Field of Search .................. 385/9–11, 130–131, 385/134, 147

[56] References Cited

U.S. PATENT DOCUMENTS

5,125,065  6/1992  Stoll et al. ........................ 385/130

FOREIGN PATENT DOCUMENTS

0 415 225  3/1991  European Pat. Off. .

OTHER PUBLICATIONS

S.P. Chen et al. "Integrated–Optics Switch with Triple–Ridge Coupler", Archiv fur Electronix & Ubertragungstechnik, Stuttgart, W. Germany, vol. 41, No. 6, Nov./Dec. 1987 pp. 377–380.

Cai et al. "A novel Three–Guide Optical Coupler Using a Taper–Formed Waveguide" J. Appl. Phys. vol. 69, No. 5 1 Mar. 1991, pp. 2810–2814.

Donnelly et al. "Optical Guided–Ware Gallium Arsenide Monolithic Interferometer" Appl. Phys. Lett. vol. 45, No. 4 15 Aug. 1984 pp. 360–362.

Motter et al, "Symmetrically Detuned Optical Three–guide Couplers in GaAs" Conference on Lasers and Electro–Optics 1988 Tech. Digest. (CLEO) (no month).

Xie et al. "Carrier–Injected GaInAsP/InP Directional Coupler Optical Switch with Both Tapered Velocity and Tapered Coupling", *IEEE Photonics Technology Letters*, vol. 4, No. 2, Feb. 1992, pp. 166–169.

E.C.M. Pennings, "Bends in Optical Ridge Waveguides: Modeling and Experiments", CIP–Gegevens Koninklijke Bibliotheek, Den Haag, 1990, pp. 1–20 and pp. 24–29. (no month).

B. Acklin et al. "Novel Optical Switches Based on Carrier Injection in Three and Five Waveguide Couplers: TIC and SIC", *Electronics Letters*, 3rd Feb. 1994, vol. 30, No. 3, pp. 217–218.

*Primary Examiner*—Akm E. Ullah
*Attorney, Agent, or Firm*—Hill, Steadman & Simpson

[57] ABSTRACT

An integrated optical arrangement operated as a switch composed of at least three ridge waveguides on a substrate, the third ridge waveguide is utilized for an infeed of an optical waveguide proceeding between two parallel ridge waveguides forming the first and second waveguides having either a contacted pn-junction or a contacted pin-junction. As a result of asymmetrical switching of the junctions, the optical wave is coupled over into one or the other of the first and second waveguides. The advantage over traditional directional coupler switch structures are complete symmetry of the two switch conditions, "digital switching behavior", enhanced separation of the output waveguide, low switching losses and greater manufacturing tolerances, reduced polarization sensitivity and increased optical bandwidth.

19 Claims, 5 Drawing Sheets

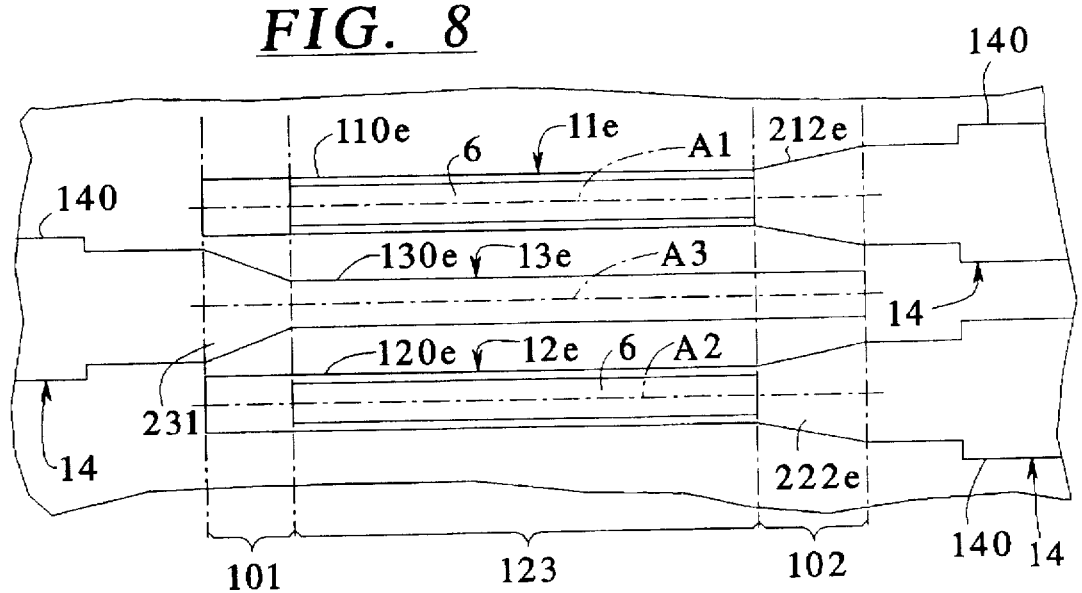
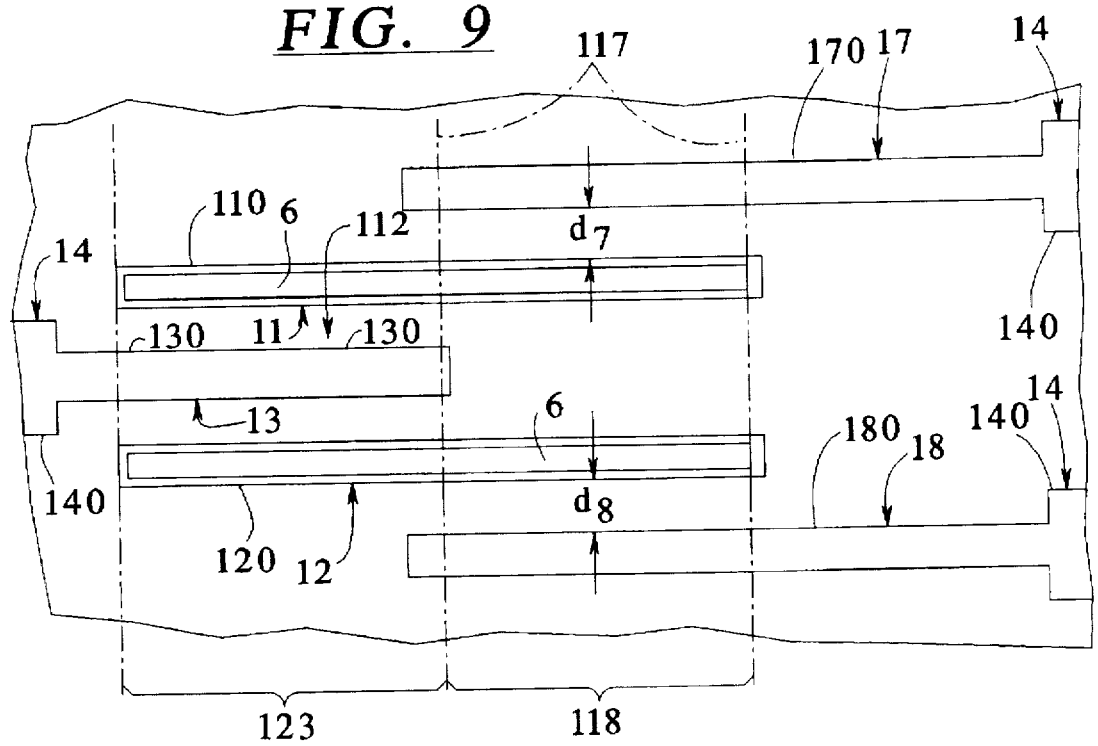

INTEGRATED OPTICAL ARRANGEMENT OF RIDGE WAVEGUIDES ON A SUBSTRATE

BACKGROUND OF THE INVENTION

The present invention is directed to an integrated optical arrangement of ridge waveguides.

U.S. Pat. No. 5,125,065, whose disclosure is incorporated herein by reference thereto and which claims priority from the same German Application as European 0 415 225 A2, discloses an integrated optical arrangement having a first and second strip-like ridge waveguide disposed on a substrate of a semiconductor material, wherein the ridge waveguide is defined by either an undoped or an n-doped waveguiding layer of semiconductor material on or in the substrate and by a strip-shaped ridge of semiconductor material that is fashioned on or over the waveguiding layer and defined by a width of the strip-like ridge waveguide. The strip-shaped ridges of the first and second strip-shaped waveguides extend side-by-side and are separated by an inner space. An externally contactable junction which is either a p-doped to n-doped material pn-junction or is a pin-junction formed by p-doped to undoped material and from the undoped to an n-doped material, are integrated in the region of the strip-shaped ridge of each of the two ridge waveguides above or below the waveguiding layer of the ridge waveguide and are integrated so that the junction from the p-doped to the n-doped or undoped material is arranged at a distance from the waveguiding layer and the p-doped material is arranged at the side of this junction facing away from the waveguiding layer. The pn- or pin-junction of both the first as well as the second waveguide can be contacted. Concrete embodiments of this known arrangement are an InP/InGaAsP directional coupler structure and an InP/InGaAsP Mach-Zehnder structure that are operated as switches.

SUMMARY OF THE INVENTION

The present invention is directed to an arrangement composed of first and second strip-like ridge waveguides on a substrate of semiconductor material, each of said ridge waveguides being defined by either an undoped or an n-doped waveguiding layer of semiconductor material on or in the substrate and by a strip-shaped ridge of semiconductor material that is fashioned on or over the waveguiding layer and defines a width of the strip-like ridge waveguide, the strip-shaped ridge of the first waveguide and the second waveguide proceeding side-by-side and separated by an interspace, an externally contactable junction selected from a junction consisting of a pn-junction of p-doped to n-doped material and a pin-junction of p-doped material to undoped material to n-doped material being integrated in the region of the strip-shaped ridge of each of these ridge-shaped waveguides above or below the waveguiding layer of the ridge waveguide and being integrated so that the junction from the p-doped to n-doped or the undoped material is arranged at a distance d from the waveguiding layer and the p-doped material is arranged at the side of this junction facing away from the waveguiding layer and wherein the junction of both the first and second waveguides can be contacted. The improvements are a third strip-like waveguide being arranged in the interspace between the ridges of the first and second waveguides, said third strip-like waveguide being defined by a waveguiding layer on or in the substrate and by a strip-shaped ridge fashioned on or over the waveguiding layer and defining a width of said third ridge waveguide and that the ridge of the third ridge waveguide has such a slight distance from the ridges of the first and second waveguides that an optical mode guided in a waveguiding layer under the ridge of the third waveguide can be coupled over into the waveguiding layer under the ridge of the first ridge waveguide and/or the second ridge waveguide and/or an optical mode guided in either of the first or second ridge waveguides can be coupled into the waveguiding layer under the ridge of the third ridge waveguide.

This improvement is an advantageous improvement and the device can operate as a switch with the arrangement of the invention having the following advantages compared to known arrangements, particularly in a directional coupler structure:

a) A complete symmetry of the two switch conditions is achieved. In switch matrices, a high uniformity of the insertion attenuation is thus achieved in the various switch conditions.

b) Digital switching behavior is achieved. Cross-talk suppression increases monotonously with the switching current. The exact value of the switching current can consequently be uncritically set.

c) An enhanced separation of the output waveguides of the switch is achieved. The construction of short, low-loss switching matrices is thereby enabled.

d) Lower switching losses are achieved.

e) Greater manufacturing tolerances, reduced polarization sensitivity and enhanced optical bandwidths are achieved.

The method of operating the arrangement includes selectively applying a current to one of the contacting means of the first and second waveguides to cause one of the junctions of one waveguide to be in a conducting direction while the other is currentless and/or in a blocking direction.

Other advantages and features of the invention will be readily apparent from the following description of the preferred embodiments, the drawings and claims.

BRIEF DESCRIPTION OF THE DRAWINGS

FIG. 8 is a plan view of a sixth embodiment wherein the end portion connecting each of the first, second and third waveguides to their respective lines has a broadened portion;

FIG. 9 is a plan view of a seventh embodiment of the arrangement of the present invention wherein neighboring ridge waveguides are respectively coupled to first and second ridge waveguides outside of the interspace between the first, second and third waveguides;

DESCRIPTION OF THE PREFERRED EMBODIMENTS

Figure 1:
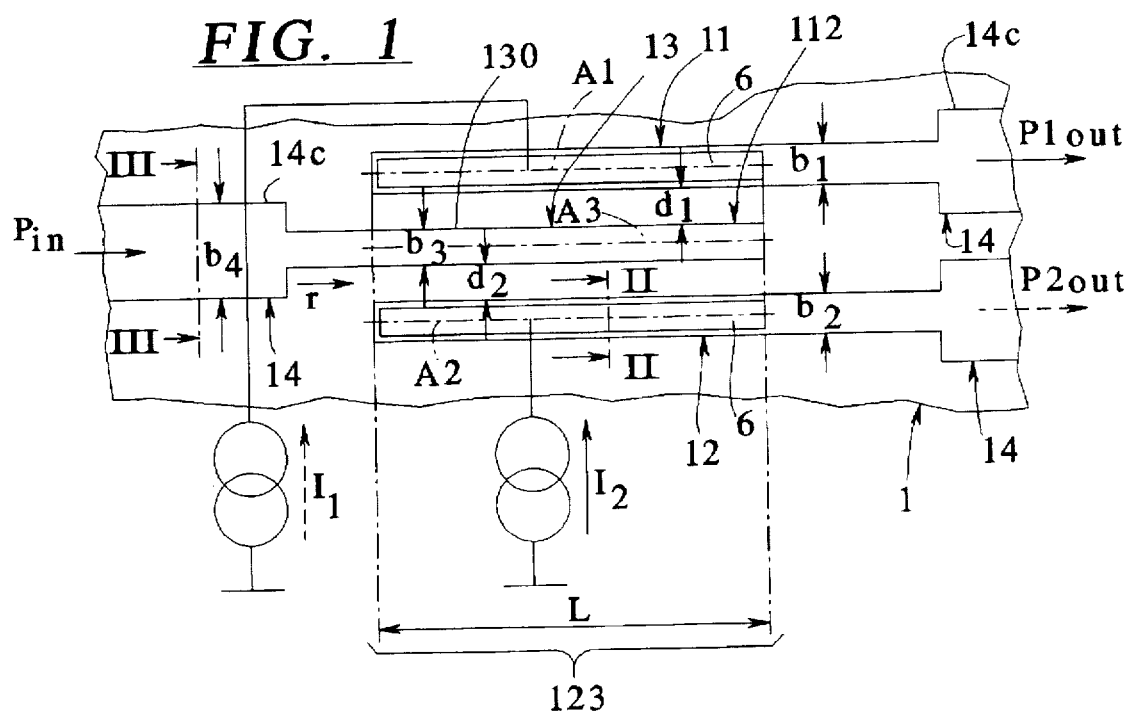
FIG. 1 is a plan view of a first exemplary embodiment of an arrangement of the present invention.
Figure 2:
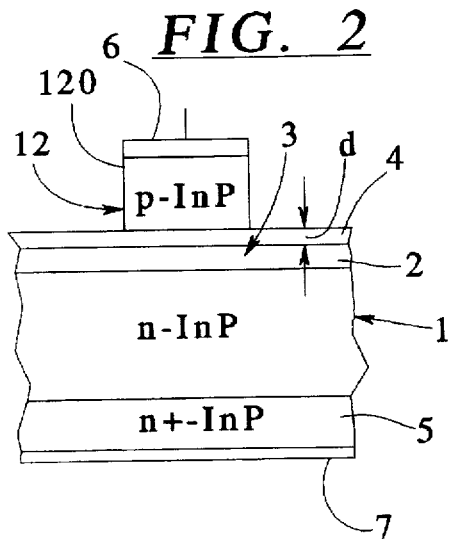
FIG. 2 is a cross sectional view taken along the lines II—II of FIG. 1 of a ridge waveguide and the substrate lying thereunder.
Figure 3:
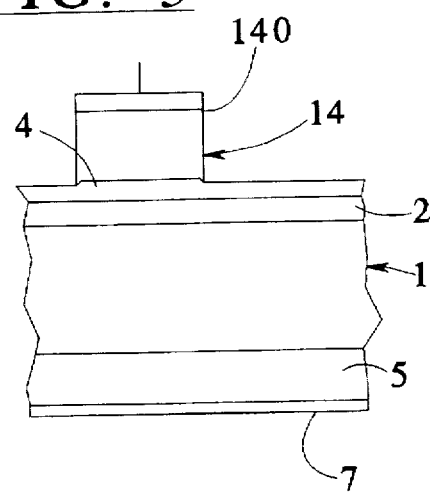
FIG. 3 is a cross sectional view taken along the lines III—III of FIG. 1 of a spread ridge waveguide and the substrate lying thereunder.

The principles of the present invention are particularly useful when incorporated in an integrated optical arrangement, which is illustrated in various embodiments in FIGS. 1–11 and is composed of a first strip-like ridge waveguide 11 and a second strip-like ridge waveguide 12 on a substrate 1 that is composed of a semiconductor material. As best illustrated in FIG. 2, the ridge waveguide 12 is defined by a waveguiding layer 2 on or in the substrate 1 and by a strip-shaped ridge 120 that is fashioned on or over the waveguiding layer 2 and defines a width $b_2$ of the strip-like waveguide 12. It should be noted that the waveguide 11 is the same and has a strip-shaped ridge 110 disposed over the layer 2 having a defined width $b_1$. The waveguiding layer 2 is composed of an undoped or of an n-doped semiconductor material. The strip-shaped ridges 110 and 120, respectively, are likewise composed of semiconductor material. The width $b_1$ is preferably selected equal to the width $b_2$.

The strip-shaped ridge or rib 110 of the first waveguide 11 and the strip-shaped ridge or rib 120 of the second waveguide 12 proceed side-by-side separated from one another by an interspace 112 which, preferably, proceeds so that their longitudinal axes A1 and A2 are parallel.

An externally contactable junction 3 of a p-doped to n-doped material to form a pn-junction or of an externally contactable junction 3 formed of a p-doped material to an undoped material and from the undoped material to an n-doped material to form a pin-junction is integrated so that the region of the strip-shaped ridges 110 or 120, respectively, of each of the two ridge waveguides 11 and 12 and above and below the waveguiding layer 2 of the ridge waveguide 11 or 12 so that the pn-junction or the pin-junction is arranged at a distance d from the waveguiding layer 2 and the p-doped material is arranged at the side of the junction 3 that faces away from the waveguiding layer 2.

Without limitation of the universality, it is assumed in the example that the substrate is composed of an n-doped InP material and that the waveguiding layer 2 is composed of an undoped InGaAsP and each rib 110 or 120 is composed of p-doped InGaAsP. It is further assumed that the spacer layer 4 of undoped In that defines the spacing is arranged between the ribs 110 and 120, respectively, and the waveguiding layer 2. In the illustrated example, a pin-junction 3 from the n-doped substrate to the p-doped rib 110 or 120 is thus present. The gap wavelength of the waveguiding layer is, for example, 1.3 μm and that of the spacer layer 4 is selected equal to 1.05 μm.

The pn-junction or pin-junction 3, as well as the first ridge waveguide 11 and the second ridge waveguide 12, is contacted. This contacting is composed of p-contact 6 being applied to the ridge 110 and the ridge 120 and of an n-contact 7 applied to the underside of the substrate 1. This n-contact 7 is applied onto the $n^+$-doped layer 5 of InP of the substrate 1.

Inventively, a third strip-like ridge waveguide 13 is arranged in the interspace 112 between the ribs 110 and 120 of the first and second ridge waveguides 11 and 12. This third ridge waveguide 13 is likewise defined by a waveguiding layer 2 on or in the substrate 1 and by a strip-shaped ridge or rib 130 formed on or over the waveguiding layer 2 and defined by a width $b_3$ of the third ridge waveguide. The structure of this third ridge waveguide 13 is identical to the structure shown in FIG. 2. However, the p-contact 6 is not present and the reference numerals 120 and 12 are replaced by the numerals 130 and 13.

The ridge 130 of the third ridge waveguide 13 has such a slight distance $d_1$ from the ridge 110 and a distance $d_2$ from the ridge 120 of the second waveguide 12 that an optical mode guided in the waveguiding layer 2 under the ridge 130 of the third ridge waveguide 13 in a direction of the longitudinal axis A3 of this third ridge waveguide can couple over into the waveguiding layer 2 under the ridge 110 of the first ridge waveguide 11 or into the waveguiding layer 2 under the ridge 120 of the second ridge waveguide and can be guided in the direction of the longitudinal axis A1 or A2, respectively, of the ridge waveguides 11 and 12. Analogously, the mode guided in the first or the second ridge waveguide can be coupled into the third waveguide 13.

For the manufacture-related reasons, the pn-junction or the pin-junction, respectively, in all exemplary embodiments extends in each existing ridge waveguide without interruption. The contacting of the pn- or the pin-junction 3 of the first and second ridge waveguides 11 and 12 is preferably present only in a common longitudinal section 123 of the three ridge waveguides 11, 12 and 13 so that the three ridge waveguides 11, 12 and 13 simultaneously proceed side-by-side. In the exemplary embodiment of FIG. 1 and also FIGS. 6–9, the three ridge waveguides 11, 12 and 13 comprise a uniform width in their longitudinal section 123, whereby $b_1=b_2=b_3$ is preferably selected and the distances $d_1$ and $d_2$ are preferably selected to be identical.

To operate the arrangements shown in FIGS. 1–11 as switches, the contacted pn-junction or, respectively, pin-junction 3 of the first and second waveguides 11 and 12 are asymmetrically operated so that the junction 3 of one of the two waveguides 11 and 12 is operated in a conducting direction, but the junction 3 of the other waveguide 12 or 11, respectively, is operated currentlessly or in a blocking direction. The optical wave coupled into the third ridge waveguide 13 and propagating in a longitudinal direction of the longitudinal axis A3 of this waveguide 13, for example in the longitudinal direction r, is coupled over into the first ridge waveguide 11 in the longitudinal section 123 when the junction 3 of the first ridge waveguide 11 is operated in conducting direction and the junction 3 of the second ridge waveguide 12 is operated currentlessly or in the blocking direction. This means that the current $I_1>0$ flows through the junction 3 of the first ridge waveguide 11 and a charge carrier injection occurs, whereas no current flows through the junction 3 of the second ridge waveguide 12. The optical wave coupled into the third waveguide 13, by contrast, is coupled over into the second ridge waveguide 12 when the junction 3 of this ridge waveguide 12 is operated in conducting direction and the junction 3 of the first ridge waveguide 11, by contrast, is operated currentlessly or in a blocking direction. In this case, the current $I_2 > 0$ flows through the junction 3 of the second ridge waveguide 12 and a charge carrier injection occurs, whereas no current flows through the junction 3 of the first ridge waveguide 11. The currents $I_1$ or $I_2$ can be generated by applying voltage differences between the contacts 6 and 7.

The charge carrier injection occurs spatially separated from the optical wave, as a result whereof a low plasma attenuation is achieved. The cross-talk of the arrangement operated as a switch is not defined by a mode interference, as occurs in directional coupler switches, but by the current-induced asymmetry of the ridge waveguides 11 and 12. The cross-talk attenuation, therefore, increases monotonously with the switching current and a "digital" switching characteristic is achieved. Over and above this, the polarization sensitivity is reduced, the optical bandwidth is increased and the manufacturing tolerances become greater.

In all exemplary embodiments, the actual arrangement only extends in the region of the longitudinal section 123 having the length L, i.e., the arrangement ends at the same time with the ends of the longitudinal sections 123. Since the modes at these ends are not exactly matched to the modes of the individual waveguides 11, 12 and 13, radiation losses will occur here. These can be reduced when the modes are adiabatically converted into one another.

Figure 4:
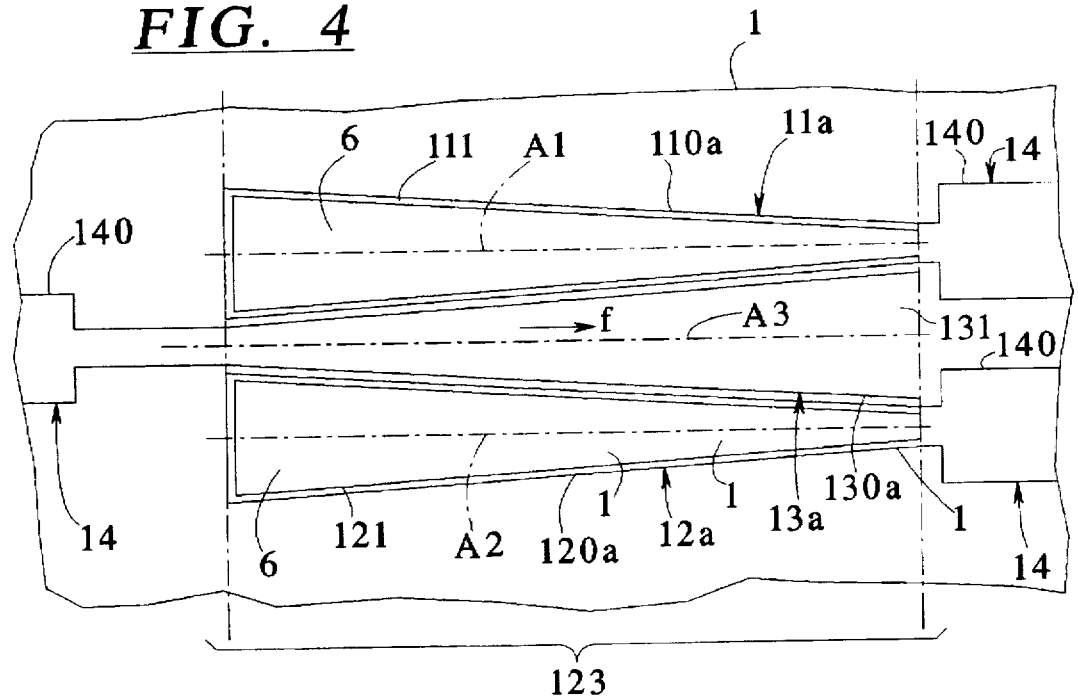
FIG. 4 is a plan view of a second embodiment of the arrangement of the present invention, wherein the three waveguides have a tapering in a common longitudinal section with the degree of tapering of the first and second waveguide decreasing as they move left-to-right in the Figure.
Figure 5:
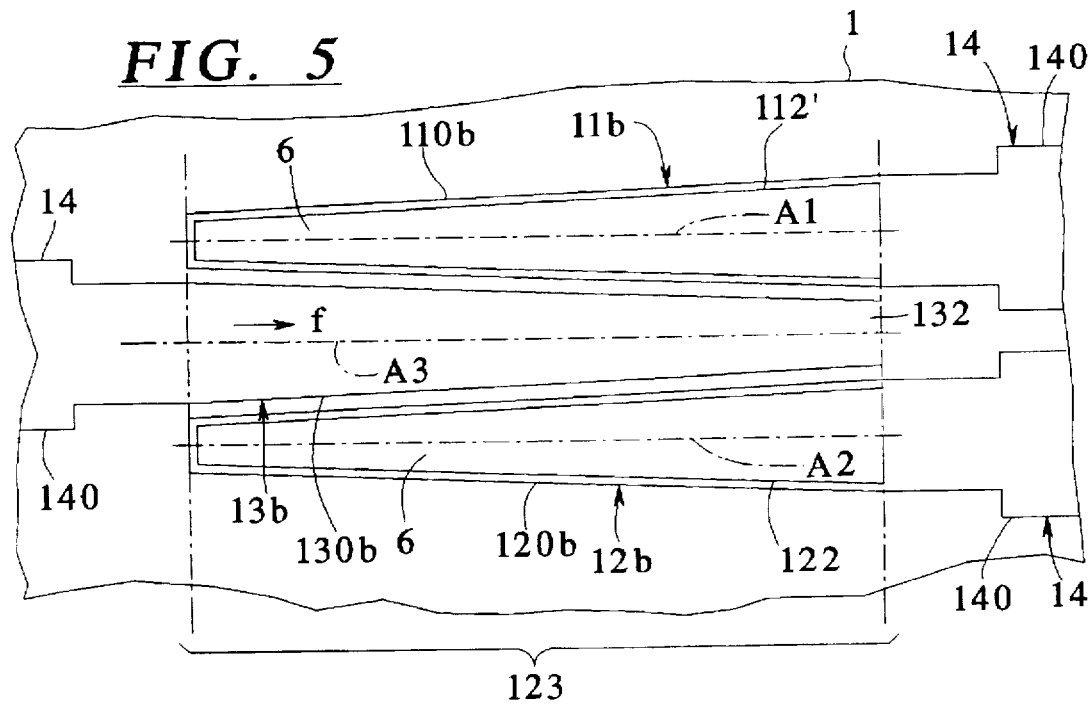
FIG. 5 is a plan view of the third embodiment with an arrangement of tapering waveguides tapering in the opposite direction to that of the embodiment of FIG. 4.

This can be achieved, for example, when a ridge 130a of the third ridge waveguide 13a comprises a taper-shaped expansion 131, as illustrated in FIG. 4, or the ridge 130b of the ridge waveguide 13b has a taper-shaped constriction 132, as illustrated in FIG. 5, with both the restrictions and expansions occurring in a longitudinal direction of the arrow r in a longitudinal section 123. The ridges 110a and 120a of the first and second ridge waveguides 11a and 12a comprise a corresponding taper-shaped constriction 111 and 121 (see FIG. 4). In the arrangement of FIG. 5, the first and second ridge waveguides 11b and 12b have ridges 110a and 120a with taper-shaped expansions 112' and 122, respectively. Each of these taper-shaped expansions or constrictions is preferably a broadening or, respectively, a constriction in terms of width.

Given such a structure of the arrangement, a "adiabatic" coupler is obtained wherein the coupling-over is achieved not only by mode interference but also by mode transformation (see S. Xie et al, "Carrier-injected GaInAsP/InP directional coupler optical switch with both tapered velocity and tapered coupling", *IEEE Photonics Technical Letter*, Vol. 4, No. 2, February 1992, pp. 166–169).

The adiabatic conversion of the modes into one another can also be achieved when the first, second or third ridge waveguides 11, 12 or 13, respectively, comprise an end section 101 and/or 102 at the end face in which the ridges 110, 120 or, respectively, 130 of the waveguides 11, 12 or 13 comprise a preferably tapered broadened portion. Examples of these are illustrated in the embodiments in FIGS. 6–8.

Figure 6:
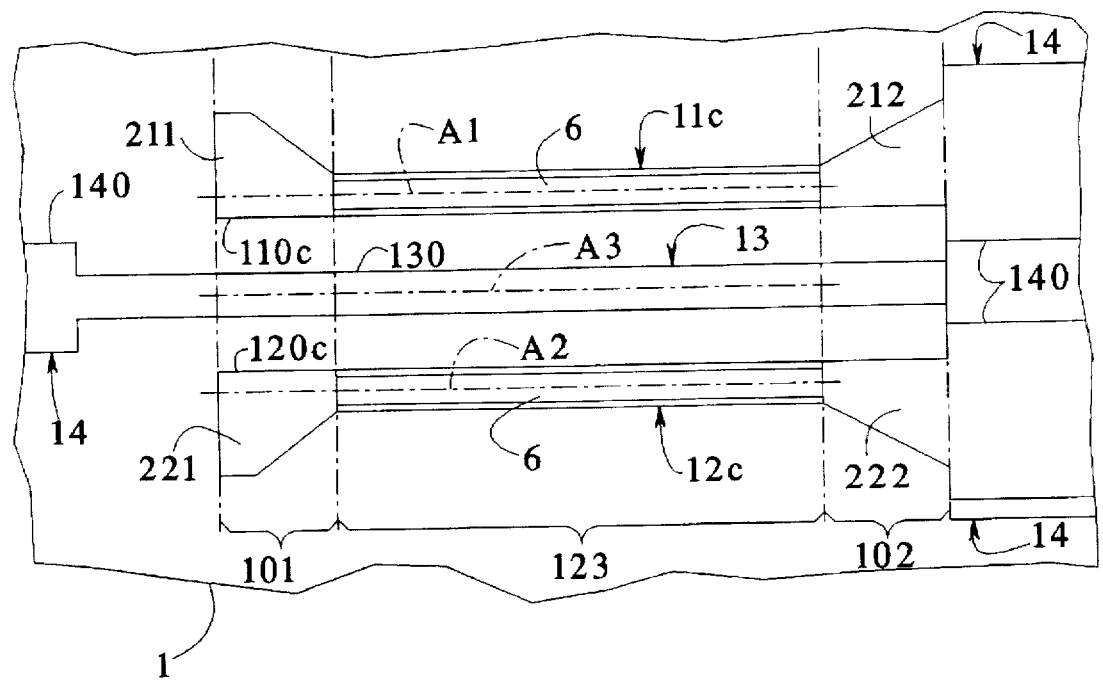
FIG. 6 is a plan view of a fourth embodiment of an arrangement wherein the end sections of each of the first and second waveguides has a broadened end portion.

In the example of FIG. 6, a first ridge waveguide 11c has a ridge 110c with a broadened end portion 211 in a left-hand section 101 and a broadened end section 212 in a right-hand section 102. In a similar manner, the second waveguide 12c has a ridge 120c with a broadened section 221 in the end section 101 and a broadened section 222 in the end section 102. As illustrated, these end sections 101 and 102 are on the ends of the longitudinal section 123. The taper-shaped broadened portions 211, 212, 221 and 222 are respectively asymmetrical relative to the longitudinal axis A1 and A2 of the waveguides 11c and 12c.

Figure 7:
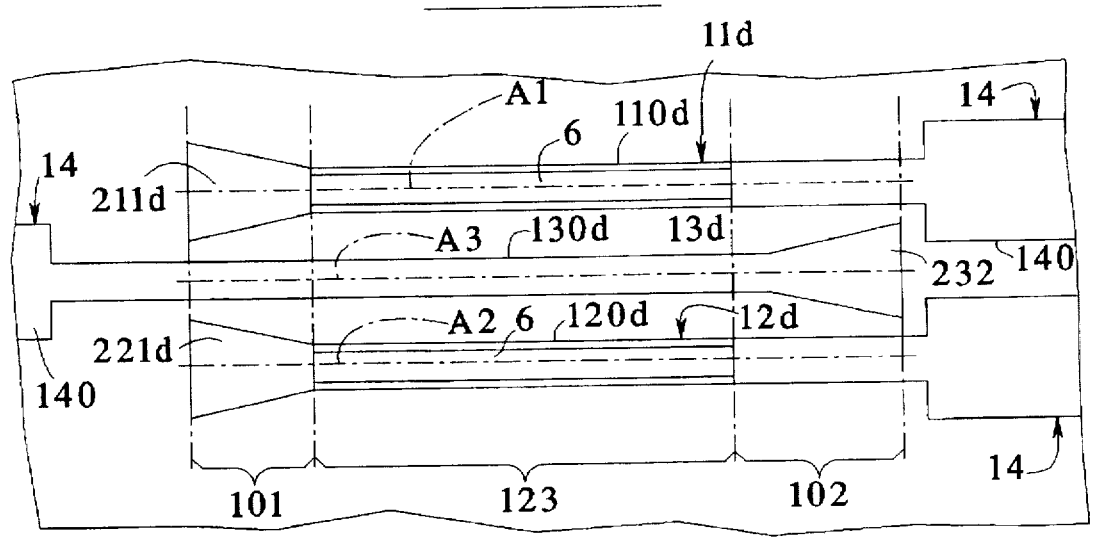
FIG. 7 is a plan view of a fifth embodiment wherein the free end of each of the waveguides has a broadened portion.

In the exemplary embodiment of FIG. 7, the first waveguide 11d and the second waveguide 12d have ridges 110d and 120d with broadening sections 211d and 221d in the left-hand end section 101 that are symmetrical relative to the longitudinal axis A2 and A2. The third ridge waveguide 13d has a ridge 130d with a taper-shaped broadened portion 232 in the end section 102 on the right-hand side of the longitudinal section 123. This broadened portion 232 is symmetrical relative to the longitudinal axis A3 of the waveguide 13d.

In the exemplary embodiment of FIG. 8, a rib or ridge 130e of the third ridge waveguide 13e is provided with a broadened portion 231 in the section 101 adjoining the longitudinal section 123 on the left. This broadened portion 231 is symmetrical relative to the axis A3 of the ridge waveguide 13e. The first ridge waveguide 11e and the second ridge waveguide 12e each respectively have ridges 110e and 120e with broadened portions 212e and 222e in the end section 102, which broadened portions are symmetrical to the axes A1 and A2 of the waveguides 11e and 12e.

In all three embodiments of FIGS. 6–8, all three of the waveguides extend at least up to the ends of the end sections 101 and 102, even when there is no broadened portion of the ridge of such a waveguide.

In order to improve the cross-talk suppression, the arrangement can be expanded to form a structure which is illustrated by the embodiment in FIG. 9. In accordance therewith, a respectively neighboring ridge waveguide 17 or 18, defined by a waveguiding layer 2 and by strip-shaped ridges 170 and 180 arranged on or above the waveguiding layer 2, are provided outside of the interspace 112 between the first and second ridge waveguides 11 and 12, respectively, next to the longitudinal section 117 or 118 of the first and second ridge waveguides 11 and 12 comprising a contacted pn- or pin-junction 3. The ridges 170 and 180 of each of the ridge waveguides 17 and 18 have such a slight distance $d_7$ and $d_8$ from the ridges 110 and 120 of the neighboring first and second ridge waveguides 11 and 12 that a guided optical mode can be coupled over between the first ridge waveguide 11 to the ridge waveguide 17 adjacent thereto or between the second ridge waveguide 12 and the ridge waveguide 18 adjacent thereto in the same way as between the third ridge waveguide 13 and the first and second ridge waveguides 11 and 12. The longitudinal sections 117 and 118 are preferably essentially situated outside the longitudinal section 123. Given the arrangement of FIG. 9, the overcoupling of the useful and cross-talk signal occurs twice so that the cross-talk value is squared. In addition, the plasma attenuation in the switched waveguide increases the cross-talk suppression. Compared to the structure of FIG. 1, lower switching currents are, therefore, anticipated for this structure for the same cross-talk ratio or for the same separation, gap or clearance. The measures illustrated in FIGS. 4–8 can also be applied to the arrangement of FIG. 9.

In all the illustrated embodiments, a strip-like ridge waveguide 14 defined by a waveguiding layer 2 and by a strip-shaped ridge 140 arranged over this waveguiding layer is optically coupled at the face end to a waveguide via which infeed or outfeed is carried out. The ridge 140 of the ridge waveguide 14 which defines the width $b_4$ thereof is broader than the ridge of the ridge waveguide to which it is coupled. The ridge waveguide 14, which is shown in section in FIG. 3, has a broader ridge 140 and is, thus, coupled to the third ridge waveguide 13 via which infeed is carried out. In the examples of FIGS. 1–8, a respective ridge waveguide 14 having a broad ridge 140 is coupled to the ridge waveguides 11 and 12 via which outfeed is carried out. In the exemplary embodiment of FIG. 9, the ridge waveguide 14 having the broader ridge 140 is coupled to the ridge waveguides 17 and 18 via which outfeed is carried out.

The employment of the broader ridge waveguide 14 connected to the arrangement has the advantage that small curvature radii can be realized given low radiation losses, wherein it is expedient to employ broader waveguides having more pronounced lateral wave guidance (see E. C. M. Pennings, "Bends in Optical Ridge Waveguides: Modeling and Experiments", CIP-Gegevens Koninklijke Bibliotheek, Den Haag, 1990, pp. 1–20 and pp. 24–29). Due to the separation of the waveguides via which outfeed is carried out, which is doubled in comparison to the directional coupler, these can be connected to the arrangement in an extremely low-loss fashion.

Fundamentally, optical waves can also be infed via the waveguides, such as 11 and 12 or, respectively, 17 and 18 and can be outfed via the third waveguide, such as 13.

Figure 10:
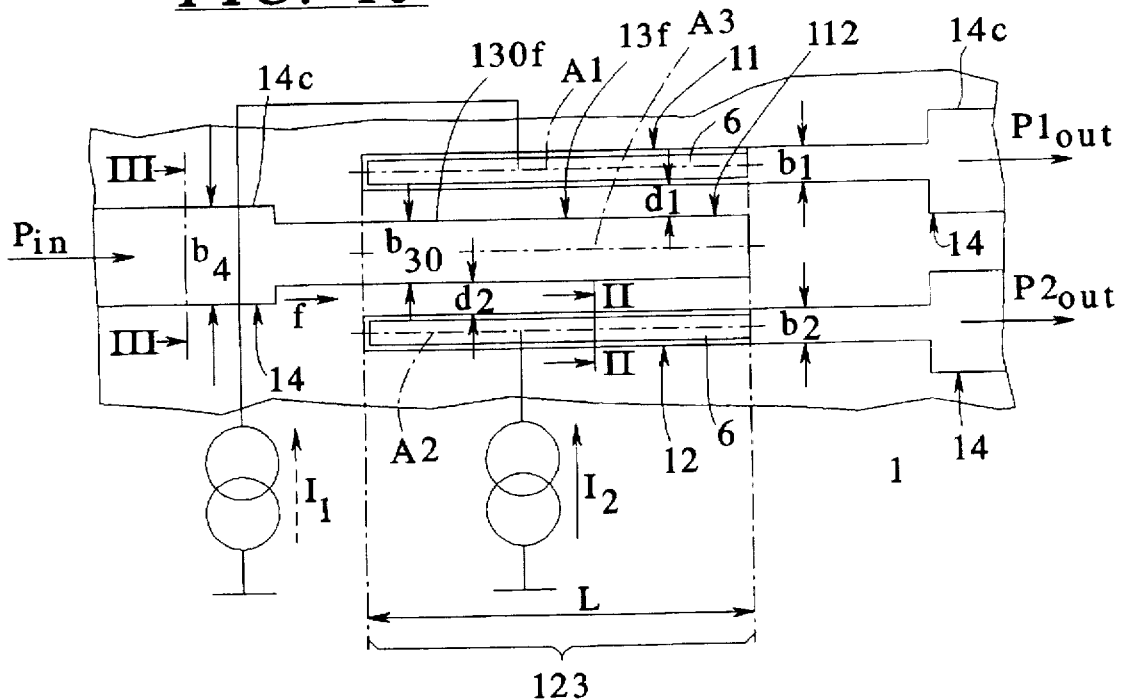
FIG. 10 is a plan view of an eighth embodiment of the arrangement of the present invention wherein the third ridge waveguide has a greater width than the first and second ridge waveguides.

An eighth exemplary embodiment of the arrangement of the present invention according to FIG. 1 is shown in FIG. 10. This embodiment differs from the exemplary embodiment of FIG. 1 in that a width $b_{30}$ of a third ridge waveguide 13f is greater than the width $b_1$ of the first ridge waveguide 11 and greater than the width $b_2$ of the second ridge waveguide 12. This measure compensates for a lowering of the refractive index in the third ridge waveguide 13f, which lowering is produced by a lateral charged carrier diffusion proceeding from the current-transverse contact. As a result thereof, a synchronous coupling in the symmetrical coupler, wherein $b_1=b_2$ is valid and is achieved in the current permeating operating condition wherein the pn- or, respectively, pin-junction 3 of either the first ridge waveguide 11 or the second ridge waveguide 12 is operated in a conducting direction to allow a complete overcoupling for both polarizations of the mode. The embodiment of FIG. 10 is not limited to the specific example of FIG. 1 but can comprise a special characteristics of the various examples of FIGS. 2–9. Advantages of the exemplary embodiment of FIG. 10 compared to the exemplary embodiment of FIGS. 1–9 are a reduced polarization dependency, improved conducting-state losses, lower cross-talk, additional increase in the spacing of the first and second ridge waveguides 11 and 12 at the output side of the arrangement.

Figure 11:
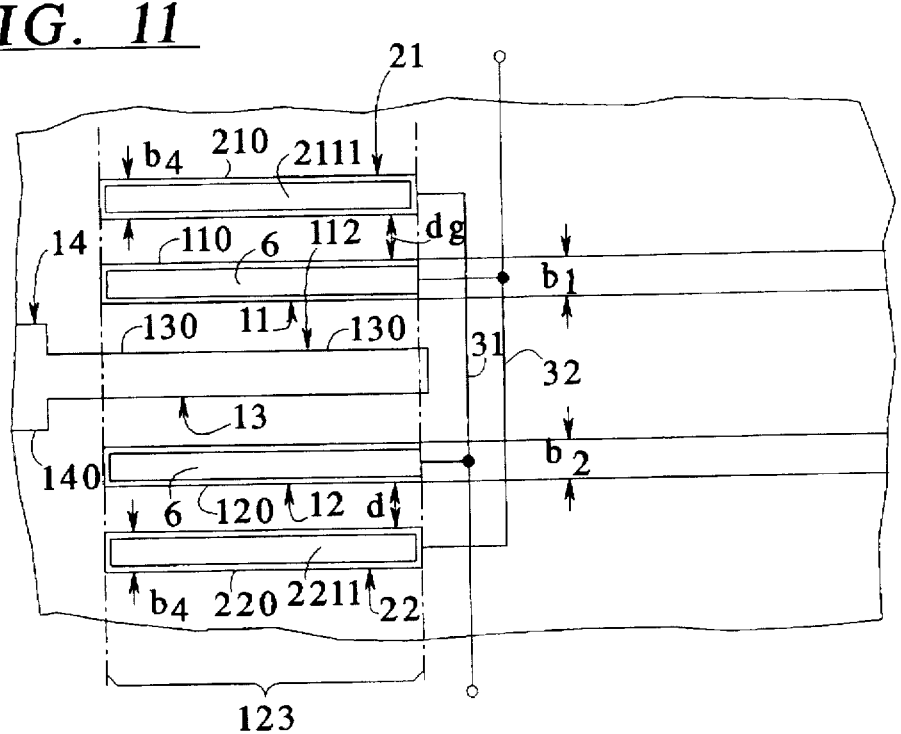
FIG. 11 is a plan view of a ninth embodiment of the arrangement of the present invention wherein two additional ridge waveguides, each of which comprises a contacted pn- or pin-junction is arranged along the side of the first and second ridge waveguides facing away from the interspace between the first and second ridge waveguides, these additional ridge waveguides extend over the entire length of the common length section of the first, second and third ridge waveguides.

A ninth embodiment of the arrangement of FIG. 1 is illustrated in FIG. 11. In this ninth embodiment, first and second additional ridge waveguides 21 and 22 are arranged outside of the first and second ridge waveguides 11 and 12 facing away from the interspace 112 between the first and second waveguides 11 and 12. These additional ridge waveguides 21 and 22, respectively, preferably extend over the entire length L of the common length section 123 of the first, second and third waveguides 11, 12 and 13 and have a contact of a pn- or pin-junction preferably extending over the entire length L of their length section 123. The junction can be constructed in the same way as the contact pn- or pin-junction 3 of the first and second waveguides 11 and 12. The width of each and every additional ridge waveguide 21 and 22 defined by a width $b_4$ of its ridge or rib 210 or 220, respectively, is preferably selected to equal the width $b_1$ or $b_2$ of the first and second ridge waveguides 11 and 12. The spacing of every additional ridge waveguide 21 and 22 from the adjacent first or second ridge waveguide is a distance $d_0$ and is preferably the same for both additional ridge waveguides 21 and 22. The junction of the first additional ridge waveguide 21 has an electrode 2111 and the junction of the second additional ridge waveguide 22 has an electrode 2211. These electrodes 2111 and 2211 preferably extend over the entire length of the pn- or, respectively, pin-junction of the respective waveguides 21 and 22. The width $b_3$ of the third waveguide 13 is preferably selected to be equal to the widths $b_1$ and $b_2$ of the first and second ridge waveguides. The exemplary embodiment of FIG. 11 is not limited to the example of the embodiment of FIG. 1 but can also be utilized with the special characteristics of each of the exemplary embodiments of FIGS. 2–10.

The operation and arrangement of the embodiment of FIG. 11 advantageously occurs so that either the pn- or pin-junction of the first ridge waveguide 11 and the pn- or pin-junction of the second additional ridge waveguides 22 arranged at the side of the second ridge waveguide facing away from the interspace 112 are operated in a conducting direction, and simultaneously the pn- or pin-junction of the second ridge waveguide 12 and the pn- or pin-junction of the first additional ridge waveguide 21 arranged on the outside of the first ridge waveguide 11 facing away from the interspace 112 are also operated currentless or in blocking direction or the junctions of the second ridge waveguide 12 and the first additional waveguide 21 are operated in a conducting direction and simultaneously the pn-junctions of the first ridge waveguide 11 and the second additional ridge waveguide 22 are operated currentlessly or in a blocking direction.

To accomplish this, it is expedient to connect the electrode 6 of the first ridge waveguide 11 and the electrode 2211 of the second additional ridge waveguide 22 to one another electrically, for example by a line or lead 32 while a line or lead 31 connects the electrode 6 of the second ridge waveguide 12 and the electrode 2111 of the first additional ridge waveguide together.

This arrangement allows a symmetrical refractive index profile to be produced in every operating condition and, thus, produces a completely symmetrical, synchronous output coupler. This will allow a complete overcoupling for both polarizations that is independent of current.

Advantages of the embodiment of FIG. 11 in comparison to the embodiments of FIGS. 1–10 are reduced polarization dependency, better conducting-state losses, lower cross-talk, digital switching characteristics which are largely current independent, as well as additional increase in the spacing of the first and second ridge waveguides 11 and 12 at the output side of the arrangement.

Each of these exemplary embodiments of the arrangements of the invention can be manufactured with the same layer sequence and with the same materials as set forth in the above-mentioned U.S. Pat. No. 5,125,065.

Although various minor modifications may be suggested by those versed in the art, it should be understood that we wish to embody within the scope of the patent granted hereon all such modifications as reasonably and properly come within the scope of our contribution to the art.

We claim:

1. In an integrated optical arrangement composed of first and second strip-like ridge waveguides on a substrate of semiconductor material, each of said ridge waveguides being defined by an undoped or an n-doped waveguiding layer of semiconductor material on or in the substrate and by a strip-shaped ridge of semiconductor material that is fashioned on and over the waveguiding layer and defines a width of the strip-shaped ridge waveguide, each of said strip-shaped ridges of the first waveguide and the strip-shaped ridges of the second waveguide proceeding side-by-side separated by an interspace, and wherein externally contactable junctions selected from a group consisting of pn-junctions of p-doped and n-doped material and pin-junctions of p-doped and n-doped material separated by a layer of undoped material being integrated in the region of the strip-shaped ridge of each of the ridge waveguides above and below the waveguiding layer of the ridge waveguide and being integral so that the junction of p-doped to n-doped or undoped material is arranged at a distance from the waveguiding layer and the p-doped material is arranged at the side of the junction facing away from the waveguiding layer and wherein each of the junctions of both the first and second waveguides is contactable, the improvements comprising a third strip-shaped ridge waveguide being arranged in the interspace between the ridges of the first and second ridge waveguide, said third strip waveguide being defined by a waveguiding layer in the substrate and by a strip-shaped ridge fashioned over the waveguiding layer defining a width of said third ridge waveguide, said third strip-shaped ridge being a slight distance from the ridge of the first ridge waveguide and from the ridge of the second ridge waveguide, the junctions of the first ridge waveguide and the second ridge waveguide extend at least over a common longitudinal section of the three ridge waveguides in which the first, second and third ridge waveguides proceed simultaneously side-by-side and the junctions of the first and second ridge waveguides are contacted over the entire length of said common longitudinal section so that an optical mode guided in the waveguiding layer under the ridge of the third ridge waveguide is selectively coupled over into one of the waveguiding layer under the ridge of the first and second ridge waveguides and an optical mode guided in the waveguiding layer under the ridge of the first and second ridge waveguides is selectively coupled into the waveguiding layer under the ridge of the third ridge waveguide.

2. An integrated optical arrangement according to claim 1, wherein the ridge of the third ridge waveguide has a taper-shaped expanded portion in a longitudinal direction of the third ridge waveguide in a common length section and the ridges of the first and second ridge waveguides have a corresponding taper-shaped constriction in said longitudinal direction.

3. An integrated optical arrangement according to claim 2, wherein the expanded portion and the constricted portion of the ridges of the waveguides are broadening and constricting in terms of the width of the ridge in the common longitudinal section.

4. An integrated optical arrangement according to claim 1, wherein the third ridge waveguide has a tapering constriction in the longitudinal direction in the common length section and the first and second ridge waveguides have tapering expanding portions in said longitudinal direction in said section.

5. An integrated optical arrangement according to claim 4, wherein the constrictions and expansions are in the widths of the ridges of said waveguides in the common section.

6. An integrated optical arrangement according to claim 1, which includes neighboring ridge waveguides respectively defined by waveguiding layers and by strip-shaped ridges arranged over said waveguiding layer proceeding outside of the interspace between the first and second ridge waveguides next to the longitudinal section of the first and second ridge waveguides which have the junctions, the ridges of each of the neighboring ridge waveguides having a slight distance from the ridge of the neighboring first and second ridge waveguides so that a guided optical mode can be coupled over between the first ridge waveguide and the neighboring ridge waveguide adjacent thereto and between the second ridge waveguide and the neighboring ridge waveguide adjacent thereto.

7. An integrated optical arrangement according to claim 6, wherein a longitudinal section of the first and second waveguides next to which the neighboring waveguides proceed outside the interspace are located outside of the longitudinal section, wherein the third ridge waveguide proceeds between the first and second ridge waveguides.

8. An integrated optical arrangement according to claim 6, which includes three fourth strip-shaped ridge waveguides each defined by a waveguiding layer and by a fourth strip-shaped ridge arranged on said waveguiding layer, said third ridge waveguide being separately coupled to one of said fourth strip-shaped ridge waveguides and each of the neighboring ridge waveguides being separately coupled to one of the remaining fourth strip-shaped ridge waveguides, each of the fourth strip waveguides having a ridge with a width being greater than the width of the ridge of the neighboring waveguides and the ridge of the third ridge waveguide.

9. An integrated optical arrangement according to claim 8, wherein the waveguiding layer of each of the neighboring ridge waveguides is composed of a material selected from undoped and n-doped semiconductor material and the ridge of each of the neighboring ridge waveguides is composed of a semiconductor material.

10. An integrated optical arrangement according to claim 1, which includes a first additional ridge waveguide and a second additional ridge waveguide, each having a junction and being arranged in the region of the common length section of the first, second and third ridge waveguides, with the first additional waveguide being arranged alongside the first ridge waveguide and the second additional waveguide being arranged alongside the second ridge waveguide so that the order is a first additional ridge waveguide, first ridge waveguide, third ridge waveguide, second ridge waveguide and second additional ridge waveguide.

11. An integrated optical arrangement according to claim 10, wherein an electrode of the first ridge waveguide is electrically connected by a lead to an electrode of the second additional ridge waveguide and an electrode of the second ridge waveguide is electrically connected by a lead to an electrode of the first additional ridge waveguide.

12. An integrated optical arrangement according to claim 1, wherein the third ridge waveguide has a width greater than the width of the first ridge waveguide and greater than the width of the second ridge waveguide.

13. An integrated optical arrangement according to claim 1, wherein at least one of the first, second and third ridge waveguides has at least a face end section wherein the ridge of the ridge waveguide comprises a broadening portion.

14. An integrated optical arrangement according to claim 13, wherein the broadening portion has a tapered shape.

15. An integrated optical arrangement according to claim 13, wherein the broadening portion is arranged outside of the contacted, common longitudinal section.

16. An integrated optical arrangement according to claim 1, wherein a strip-shaped fourth waveguide defined by a waveguiding layer and by a strip-shaped ridge arranged above the waveguiding layer is optically coupled to the third ridge waveguide at the end face thereof, the ridge of the additional ridge waveguide defining the width thereof being broader than the ridge of the third ridge waveguide.

17. An integrated optical arrangement according to claim 1, which includes a pair of fourth strip-like waveguides defined by a waveguiding layer and a fourth strip-shaped ridge arranged over the waveguiding layer, one of said pairs of the fourth waveguides being connected to the first ridge waveguide and the other of said pairs of fourth ridge waveguides being connected to the second ridge waveguide, each of said fourth waveguides having a ridge with a width broader than the ridge of the respective first or second ridge waveguide to which it is coupled.

18. An integrated optical arrangement according to claim 1, wherein the waveguiding layer of the third ridge waveguide is composed of a material selected from undoped and n-doped semiconductor material and the ridge of the third ridge waveguide is composed of a semiconductor material.

19. A method of operating an integrated optical arrangement comprising the step of providing an arrangement having a first and second strip-like ridge waveguide on a substrate of semiconductor material, with a third strip-like ridge waveguide arranged therebetween, each of said ridge waveguides being defined by a waveguiding layer selected from undoped and n-doped semiconductor material on the substrate and a strip-shaped ridge of semiconductor material that is fashioned on and over the waveguiding layer and defining a width of the strip-like ridge, each of the strip-shaped ridges of the first, second and third strip-shaped ridges proceeding side-by-side separately, the first and second ridge waveguides having an externally contactable junction selected of a pn-junction with a p-doped to n-doped material and a pin-junction of a p-doped material and n-doped material separated by an undoped layer of material, each of the junctions of the ridges of the first and second waveguides being arranged with the p-doped layer at a distance from the waveguiding layer and the p-doped material being arranged on that side of the junction facing away from the waveguiding layer, and the junctions of both the first and second waveguides being contacted, and asymmetrically operating the junctions of the first and second waveguides wherein the junctions of one of the first and third ridge waveguides is in a conducting direction while the other of the first and second ridge waveguides is in a currentless and blocking direction.

* * * * *